June 14, 1938.    C. LE BLEU    2,120,839
EARTH WORKING IMPLEMENT
Filed Feb. 19, 1936    2 Sheets-Sheet 1

INVENTOR
Charles Le Bleu
BY
ATTORNEY

June 14, 1938. C. LE BLEU 2,120,839
EARTH WORKING IMPLEMENT
Filed Feb. 19, 1936 2 Sheets-Sheet 2

INVENTOR
Charles Le Bleu
BY
ATTORNEY

Patented June 14, 1938

2,120,839

UNITED STATES PATENT OFFICE 2,120,839

EARTH WORKING IMPLEMENT

Charles Le Bleu, Los Angeles, Calif.

Application February 19, 1936, Serial No. 64,676

15 Claims. (Cl. 97—74)

This invention relates to earth working implements of the class variously known as rippers, rooters, sub-soilers, plows, scarifiers, cultivators, and the like used in digging up the earth, loosening, or otherwise cultivating or working the earth.

The principal object of this invention is the provision of an earth working implement adapted to dig earth when in operating position and adapted to serve as a ground roller when in idle or non-operating position.

Another object is the provision in an earth working implement of the class named of a draft frame and means journaled thereon adapted to dig earth in digging position and serve as a ground roller in idle position, thus eliminating the necessity for wheels, yet the implement may be rolled over the ground when moving the same from one location to another.

Another object is the provision in an implement of the class named of such design, co-relation and construction of parts, members, and features that the implement will be simple in construction, comparatively of less weight, yet strong, durable, and efficient in the uses to which such implements are usually put.

Other objects and advantages of the invention will be apparent as the following specification is read in connection with the accompanying drawings wherein like reference characters designate corresponding parts.

Figure 1:
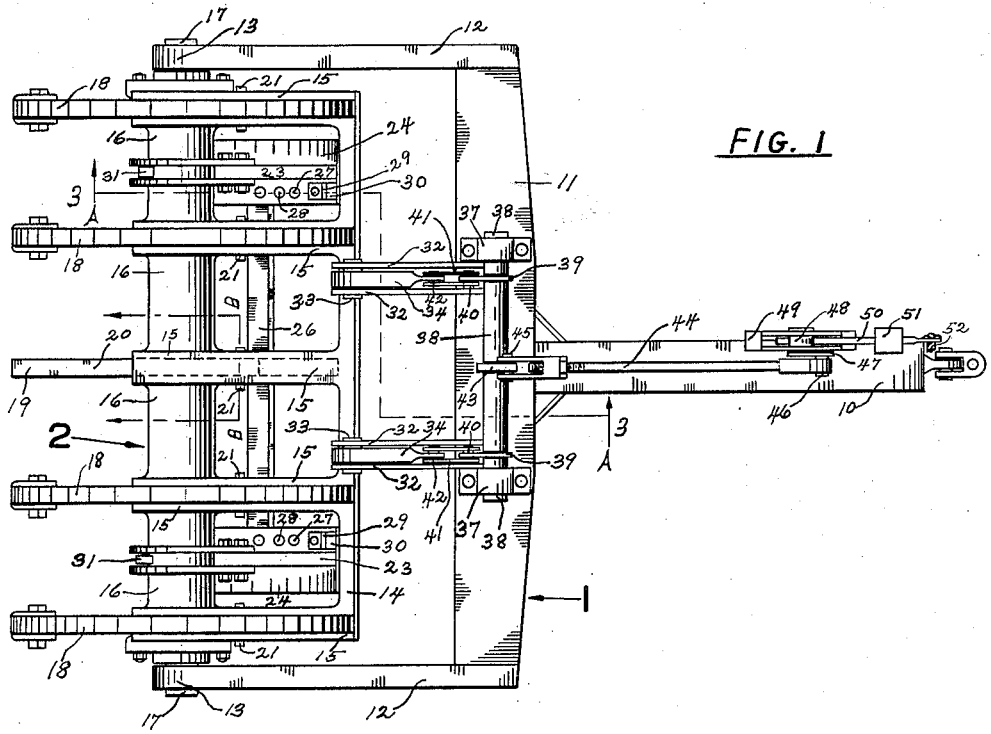
Figure 1 is a plan view of the implement.

Referring now to reference characters on the drawings, a draft frame 1 comprises a draft beam 10 adapted at its forward end for connection to a draft device, such as a tractor, and attached at its rear end to cross beam 11 having attached at each end thereof side frames 12 having journaled at their rear ends, at 13, an implement body 2. Thus it is apparent that a draft device connected to the forward end of draft beam 10 may draw the implement across a surface to be treated.

Figure 2:
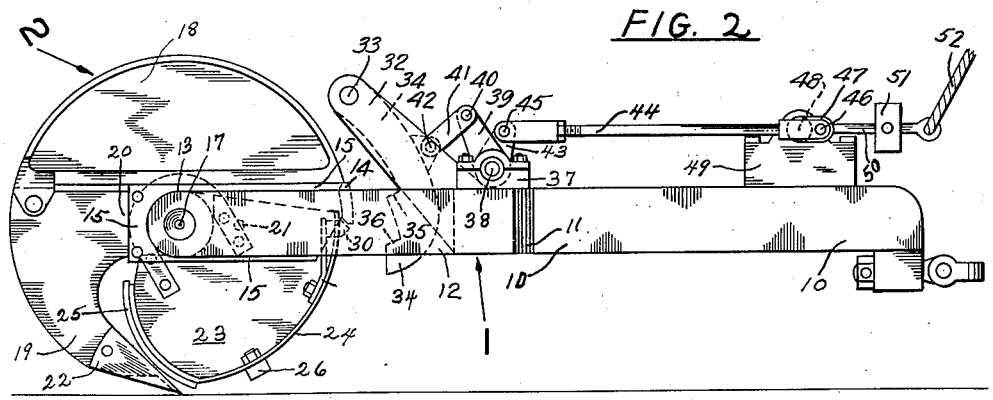
Figure 2 is a side elevation of Figure 1.
Figure 3:
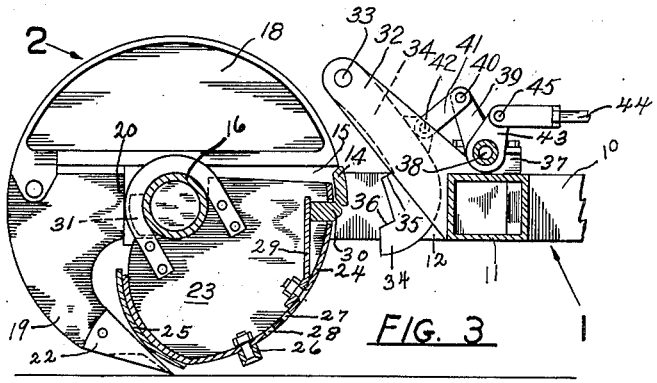
Figure 3 is a fragmentary side elevation in section taken on a line A—A, see Figure 1, all parts in rolling position.
Figure 7:
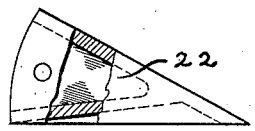
Figure 7 is an enlarged side elevation, partly in section, of the ground tool.
Figure 8:
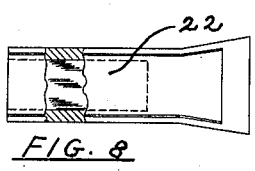
Figure 8 is an enlarged bottom view, partly in section, of the ground tool.

The implement body may be formed in a number of different ways, such as castings, or may be formed from a number of different standard shapes, but as here shown comprises a steel bar 14 provided with rearwardly extending box-like beams 15 carrying between their rear ends cylindrical tubular members 16 attached at each of their ends to the rear end of a box-like beam 15. Certain of box-like beams 15 carry trunnions 17 journaled in the rear ends of side frame 13. Rigidly secured to the top side of a plurality of box-like beams 15 and extending longitudinally therewith and overhanging beams 15 at the rear ends thereof, is a plurality of members 18 extending outwardly at right angles to the horizontal pivotal connections of said implement body 2 with draft frame 1, the outer limits of members 18 terminating radially a uniform distance from the center of trunnions 17. 19 designates a multiplicity of standards including a forwardly extending portion 20 adapted to be inserted and mounted in the rear ends of box-like beams 15 by a pin 21. The lower ends of standards 19 are adapted to detachably carry an earth working tool 22, and the outer limits of standards 19 and earth working tools 22 terminate radially a uniform distance, corresponding to the termination of the outer limits of members 18, from the center of trunnions 17. Journaled on cylindrical members 16 are shutters 23 the outer limits of which are provided with a rim 24 the outer limits of which terminate radially a uniform distance, substantially corresponding to the termination of the outer limits of members 18 and standards 19, from the center of trunnions 17. Shutters 23 are provided with runners 25 and are cross connected by a stop bar 26. It should be noted that stop bar 26 is removably secured in place and may be removed and re-attached at holes 27 and 28, see Figure 3, provided for this purpose and in this manner the penetration of earth working tools may be limited to a desired depth. Shutters 23 are provided with resilient means 29 secured at one end to the shutter 23 and carrying at its opposite end a detent 30 adapted to releasably engage bar 14 formed to co-operate therewith by means of which shutters 23 may be retained in rolling or idle position, see Figures 2 and 3, and may be released to allow shutters 23 to assume the skidding and digging positions shown in Figures 4 and 5. It should be noted that cylindrical members 16 are provided with blocks 31 to prevent lateral shifting of the shutters 23 on cylindrical member 16 and to limit the closing action of shutters 23, see Figure 3.

Mounted on cross beam 11 are brackets 32 carrying at their upper end pins 33. Journaled at their upper ends on pins 33 for swinging movement are arms 24 having formed thereon detents 35 and 36 for engaging and releasing stop bar 26. Journaled in bearings 37 mounted on cross beam 11 is a crank shaft 38 carrying crank arms 39 adjacent bearings 37. Pivotally connected to the upper ends of crank arms 39 at 40 are links 41 connected at their rear ends at 42 to arms 34. Thus, rocking shaft 38 will result in swinging arms 34. Crank shaft 38 also carries, midway between the ends thereof, crank arm 43. An adjustable rod 44 is connected at its rear end at 45 to the upper end of crank arm 43 and is connected at its forward end at 46 to a crank arm 47 carried by a short crank shaft 48 journaled in brackets 49 carried by draft beam 11. Secured to short crank shaft 48 is an operating lever 50 carrying adjacent its outer end a weight 51, said operating lever 50 being adapted at its outer end to receive a pull rope 52 which extends thence to within easy reach of the operator.

It will have been noticed that the implement body 2 has three selectable positions. Figures 1, 2, and 3 show the implement in the idle rolling position. In this position the implement body is adapted to serve as a ground roller and may be rolled over the ground as a wheeled implement.

Figure 4:
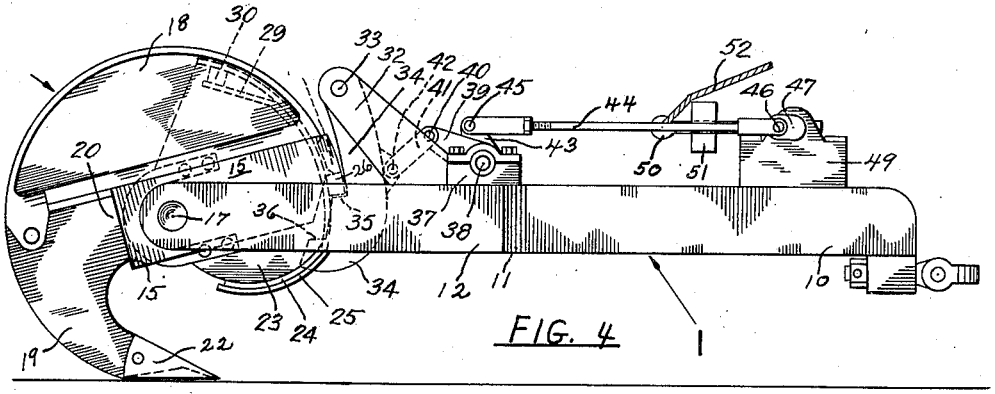
Figure 4 is a side elevation with all parts in skidding position.

Figure 4 illustrates the skidding position. The implement being in idle position, see Figures 2 and 3, operating lever 50 may be swung to the position shown in Figure 4 thus swinging arms 34 to position detent 35 in the path of stop bar 26 and since stop bar 26 is in the path of bar 14 the various parts will assume the relative positions of Figure 4 and the implement body 2 may be skidded to substantially the exact spot where digging is to begin.

Figure 5:
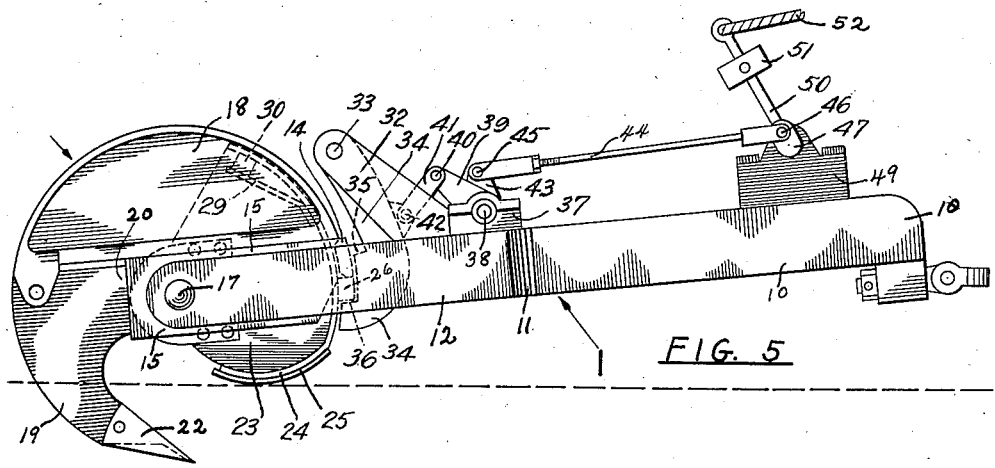
Figure 5 is a side elevation of the implement in digging position.
Figure 6:
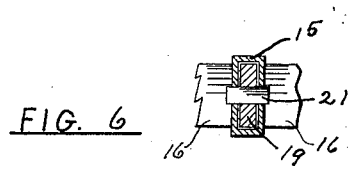
Figure 6 is a section taken on line A—A, see Figure 1.

Figure 5 shows the implement in digging position. Being in the skidding position, see Figure 4, when the spot has been reached at which digging is to begin, operating lever 50 may be swung forward to the position shown in Figure 5, thus withdrawing detent 35 from engagement with stop bar 26 allowing the implement body 2 to rotate until stop bar 26 engages detent 36 resulting in disposing ground working tools 22 relative to the ground so that said tools may penetrate the earth as shown in Figure 5. The heavy broken line of Figure 5 indicates the ground surface.

When it is desired again to assume rolling or idle position, operating lever 50 is swung forward to withdraw detents 36 from engagement with stop bar 26 and return arms 34 to position shown in Figure 3. The implement is drawn over the surface of the ground, and as the implement body 2 revolves, the forward outer portion of shutters 23, see Figure 5, and stop bar 26 will engage the ground and shutters 23 will be closed to the position of Figure 3 as the implement advances.

From the foregoing description it will be apparent to one versed in the art that I have disclosed and described a device as substantially fulfills the objects of the invention as set forth, and while the accompanying drawings and these specifications set forth in detail the present preferred construction of the device, in practice such arrangement, correlation and construction of parts, members and features may be resorted to as do not form a departure from the spirit of the invention as defined in the claims.

Having thus described my invention, what I claim as novel and useful and desire to secure by Letters Patent is:

1. An earth working implement having working and idle positions comprising a draft frame, an implement body comprising a frame, a plurality of earth working tools carried thereby for digging the earth, and means whereby said implement body may serve as a ground roller, said implement body being journaled on said draft frame to serve as a rolling support in idle position.

2. An earth working implement adapted to be moved over a surface to be treated comprising a frame, an earth working device provided with a plurality of earth working tools and means shiftable in relation to said device for selectively adapting said device to dig earth or serve as a ground roller, said device being journaled on said frame to serve as rolling supports therefor.

3. In an earth working implement adapted to be moved over a surface to be treated and having working and idle positions, a draft frame, an earth working device comprising a frame, a plurality of earth working tools carried thereby, means shiftable in relation to said device to selectively adapt said device to dig earth in working position and serve as a ground roller in idle position, means for retaining said shiftable means in idle position, and means mounting said earth working device on said draft frame to serve as a rolling support therefor.

4. In an earth working implement adapted to be moved over a surface to be treated, a draft frame, an earth working device having working and idle positions comprising a frame, a plurality of earth working tools carried thereby, means shiftable in relation to said device to selectively adapt said device to dig earth in working position and serve as a ground roller in idle position, means for retaining said shiftable means in idle position, said earth working device being journaled on said draft frame to serve as a rolling support therefor in idle position.

5. In an earth working implement adapted to be moved over a surface to be treated, a draft frame, an earth working device having working and idle positions comprising a frame, a plurality of earth working tools carried thereby, means shiftable in relation to said device to selectively adapt said device to dig earth in working position and serve as a ground roller in idle position, means for retaining said shiftable means in idle position, means mounting said earth working device on said draft frame to serve as a rolling support in idle position, and means carried by said draft frame to retain said earth working device in working position.

6. In an earth working implement adapted to be moved across a surface to be treated, a draft frame, an earth working device having working and idle positions comprising a frame, a plurality of earth working tools carried thereby, means shiftable in relation to said device to selectively adapt said device to dig earth in working position and serve as a ground roller in idle position, means for retaining said shiftable means in idle position, means mounting said earth working device on said draft frame to serve as a rolling support in idle position, and means carried by said draft frame to releasably retain said earth working device in working position.

7. In an earth working implement adapted to be moved across a surface to be treated, a draft frame, an earth working device having working and idle positions comprising a frame, a plurality of earth working tools carried thereby, means shiftable in relation to said device to selectively adapt said device to dig earth in working position and serve as a ground roller in idle position, means for retaining said shiftable means in idle position, means mounting said earth working device on said draft frame to serve as a rolling support in idle position, and means carried by said draft frame to releasably retain said earth working device in working position.

8. In an earth working implement adapted to be moved over a surface to be treated, a draft frame, an earth working device having working and idle positions comprising a frame, a plurality of earth working tools carried thereby, means shiftable in relation to said device to selectively adapt said device to dig earth in working position and serve as a ground roller in idle position, means to contact the ground in working position to limit penetration of said ground working tools, means for retaining said shiftable means in idle position, means mounting said earth working device on said draft frame to serve as a rolling support, and means carried by said draft frame to releasably retain said earth working device in working position.

9. In an earth working implement adapted to be moved across a surface to be treated, a draft frame, an earth working device having working and idle positions comprising a frame, a plurality of earth working tools carried thereby, means shiftable in relation to said device to selectively adapt said device to dig earth in working position and serve as a ground roller in idle position, means to contact the ground in working position to limit penetration of said ground working tools, means for retaining said shiftable means in idle position, means mounting said earth working device on said draft frame to serve as a ground roller in idle position, and means carried by said draft frame to releasably arrest revolution of said earth working device in a plurality of angular positions.

10. In an earth working implement adapted to be moved over a surface to be treated, a draft frame, an earth working device having working and idle positions comprising a frame, a plurality of earth working tools carried thereby, means shiftable in relation to said device to selectively adapt said device to dig earth in working position, serve as a ground roller in idle position, and limit penetration of said earth working tools, means for retaining said shiftable means in idle position, means mounting said earth working device on said draft frame to serve as a ground roller, and means carried by said draft frame positionable to arrest revolution of said earth working device and positionable to release said earth working device for free revolution.

11. In an earth working implement adapted to be moved over a surface to be treated, a draft frame, an earth working device having digging and rolling positions comprising a frame, a plurality of earth working tools carried thereby, means shiftable in relation to said earth working device to thereby adapt said device to dig earth in digging position and serve as a ground roller in rolling position, said earth working device being journaled on said draft frame to serve as a rolling support therefor in rolling position.

12. In an earth working implement adapted to be moved across a surface to be treated, a draft frame, an earth working device comprising a frame, a plurality of earth working tools carried by said frame, means shiftable in relation to said earth working device to thereby adapt said device to dig earth and shiftable to adapt said device to serve as a ground roller, and means mounting said earth working device on said frame to serve as a rolling support therefor in idle position.

13. In an earth working implement adapted to be moved over a surface to be treated, a draft frame, a plurality of earth working elements disposed along a horizontal axis, and means adapting said ground working elements to dig earth in working position and serve as a ground roller in idle position, said earth working elements being journaled on said draft frame to serve as a rolling support therefor in idle position.

14. In an earth working implement adapted to be moved over a surface to be treated, a draft frame, an earth working device comprising a plurality of earth digging elements, a plurality of ground engaging elements fixed relative to said earth digging elements, the plurality of ground engaging elements shiftable relative to said earth digging elements, all of said elements being disposed about a horizontal axis and extending radially a uniform distance therefrom, said shiftable elements being positionable to adapt said device to dig earth or serve as a ground roller, and means mounting said earth working device on said draft frame to serve as a rolling support therefor in idle position.

15. In an earth working implement adapted to be moved over a surface to be treated, a draft frame, an earth working device comprising a plurality of earth digging elements, a plurality of ground engaging elements fixed relative to said earth digging elements, said ground engaging elements being shiftable relative to other elements, all of said elements being disposed about a horizontal axis and extending radially therefrom a uniform distance, said shiftable elements being positionable to adapt said device to dig earth and limit the penetration of earth digging elements and positionable to adapt said device to serve as a ground roller, said earth working device being journaled on said draft frame to serve as a rolling support therefor in idle position.

CHARLES LE BLEU.